(12) United States Patent
Jacobson (10) Patent No.: US 10,886,835 B2
(45) Date of Patent: Jan. 5, 2021

(54) SOLID STATE REGULATOR AND CIRCUIT BREAKER FOR HIGH-POWER DC BUS DISTRIBUTIONS

(71) Applicant: RAYTHEON COMPANY, Waltham, MA (US)

(72) Inventor: Boris S. Jacobson, Westford, MA (US)

(73) Assignee: RAYTHEON COMPANY, Waltham, MA (US)

(*) Notice: Subject to any disclaimer, the term of this patent is extended or adjusted under 35 U.S.C. 154(b) by 665 days.

(21) Appl. No.: 15/628,015

(22) Filed: Jun. 20, 2017

(65) Prior Publication Data

US 2018/0366974 A1    Dec. 20, 2018

(51) Int. Cl.
| | | |
|---|---|---|
| *H01H 73/00* | (2006.01) |
| *H02M 1/32* | (2007.01) |
| *G05F 1/14* | (2006.01) |
| *H02H 3/00* | (2006.01) |
| *H02M 3/142* | (2006.01) |
| *H02H 3/087* | (2006.01) |
| *H02H 9/02* | (2006.01) |
| *H02M 7/515* | (2007.01) |
| *H02M 1/34* | (2007.01) |
| *H02H 7/00* | (2006.01) |

(52) U.S. Cl.
CPC ............ *H02M 1/32* (2013.01); *G05F 1/14* (2013.01); *H02H 3/006* (2013.01); *H02H 3/087* (2013.01); *H02M 3/142* (2013.01); *H02H 7/008* (2013.01); *H02H 9/028* (2013.01); *H02M 7/5157* (2013.01); *H02M 2001/342* (2013.01)

(58) Field of Classification Search
CPC ........ H02J 7/355; H02J 7/0088; H02H 3/006; G05F 1/14; B63J 3/04; H02M 1/32; H02M 3/142

USPC ........................................................ 361/115
See application file for complete search history.

(56) References Cited

U.S. PATENT DOCUMENTS 3,303,388 A     2/1967 Means
3,534,226 A    10/1970 Lian
(Continued)

FOREIGN PATENT DOCUMENTS

WO     2017025927 A1    2/2017

OTHER PUBLICATIONS

PCT International Search Report and Written Opinion; International Application No. PCT/US2018/037212; International Filing Date: Jun. 13, 2018; dated Sep. 25, 2018; pp. 1-16.
(Continued)

*Primary Examiner* — Jared Fureman
*Assistant Examiner* — Lucy M Thomas
(74) *Attorney, Agent, or Firm* — Cantor Colburn LLP (57) ABSTRACT

An electrical circuit and a method for regulating current and providing a circuit breaker to the electrical circuit. The circuit includes a bidirectional cell including a set of forward switches for power flow during a forward mode of operation and a set of reverse switches for providing reverse power flow during a reverse mode of operation, a control inductor for controlling current flow during the reverse mode of operation, and a voltage clamping switch configured to provide the control inductor in the circuit during the reverse mode of operation and remove the control inductor from the circuit during the forward mode of operation. The circuit is operated in at least the reverse mode of operation.

11 Claims, 6 Drawing Sheets

(56) References Cited

U.S. PATENT DOCUMENTS

| | | | |
|---|---|---|---|
| 3,543,091 A | | 11/1970 | Marek |
| 3,564,336 A | | 2/1971 | Buergi et al. |
| 3,654,518 A | | 4/1972 | Phelps et al. |
| 3,668,483 A | | 6/1972 | Kellenbenz |
| 3,723,816 A | * | 3/1973 | Pollard .............. H03K 17/0824 |
| | | | 361/58 |
| 3,792,289 A | | 2/1974 | Kezem |
| 3,851,218 A | | 11/1974 | York |
| 4,245,184 A | | 1/1981 | Billings et al. |
| 4,245,185 A | | 1/1981 | Mitchell et al. |
| 4,490,769 A | | 12/1984 | Boenig |
| 5,561,579 A | | 10/1996 | Gyugyi et al. |
| 5,581,433 A | | 12/1996 | Jordan |
| 5,606,482 A | | 2/1997 | Witmer |
| 5,726,848 A | | 3/1998 | Boenig |
| 6,104,106 A | * | 8/2000 | Partridge ............... H02H 9/001 |
| | | | 307/126 |
| 6,515,840 B2 | | 2/2003 | Govi et al. |
| 2003/0132736 A1 | | 7/2003 | O'Mara et al. |
| 2016/0254658 A1 | | 9/2016 | Jacobson |
| 2018/0241202 A1 | | 8/2018 | Mokhberdoran et al. |

OTHER PUBLICATIONS

Savaliya et al.; "Protection of DC System using Bi-directional Z-Source Circuit Breaker", IECON 2016—42nd Annual Conference of the IEEE Industrial Electronics Society, IEEE, Oct. 23, 2016, pp. 4217-4222.

* cited by examiner

SOLID STATE REGULATOR AND CIRCUIT BREAKER FOR HIGH-POWER DC BUS DISTRIBUTIONS

BACKGROUND

The present disclosure relates generally to solid-state circuits, and more particularly, to a solid-state circuit combining circuit breaking and current regulating capabilities in bother forward power and reverse power modes of operation.

Many known electrical power and distribution systems include circuit breakers configured to completely interrupt current flowing between two points of the system in response to a circuit fault condition such as, for example, a short-circuit condition. Moreover, electromechanical circuit breakers typically take milliseconds to respond to short-circuit fault conditions. Emerging solid-state circuit breakers, therefore, often utilize semiconductor devices such as insulated-gate bipolar transistors (IGBTs), for example, to completely interrupt the current flowing through the circuit.

Conventional solid state circuit breakers based on transistors typically have low surge current capabilities and cannot sustain internal failures. Moreover, the instantaneous change in current level in response to instantaneously interrupting current flow can cause voltage surges that can degrade and/or damage the semiconductor switches leading to stress-induced switch failures. Transient voltage suppressing components are typically implemented in conventional solid-state circuit breakers to protect the transistors from voltage surges. These transient voltage suppressing components, however, increase the cost and complexity of the overall circuit breaker. The transient voltage suppressing components are also susceptible to stress-induced degradation, thereby resulting in unreliable protection of the semiconductor devices over time.

SUMMARY

According to a non-limiting embodiment, an electric circuit comprises a bidirectional cell including a set of forward switches for power flow during a forward mode of operation and a set of reverse switches for providing reverse power flow during a reverse mode of operation; a control inductor for controlling current flow during the reverse mode of operation; and a voltage clamping switch configured to provide the control inductor in the circuit during the reverse mode of operation and remove the control inductor from the circuit during the forward mode of operation.

According to another non-limiting embodiment, a method of regulating current and providing a circuit breaker to a circuit comprises: forming an electric circuit between a first input voltage rail and a second input voltage rail, the electrical circuit including: a bidirectional cell including a set of forward switches for power flow during a forward mode of operation and a set of reverse switches for providing reverse power flow during a reverse mode of operation, a control inductor for controlling current flow during a reverse mode of operation, and a voltage clamping switch that is active during a reverse mode of operation to include the control inductor in the circuit and inactive during a forward mode of operation to remove the control inductor from the circuit; and operating the circuit in at least the reverse mode of operation.

According to yet another non-limiting embodiment, an electric system including a circuit for power regulation and circuit breaking comprises: a bidirectional cell including a set of forward switches for power flow during a forward mode of operation and a set of reverse switches for providing reverse power flow during a reverse mode of operation; a control inductor for controlling current flow during the reverse mode of operation; and a voltage clamping switch configured to provide the control inductor in the circuit during the reverse mode of operation and remove the control inductor from the circuit during the forward mode of operation.

Additional features are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

According to various non-limiting embodiments of the invention, a circuit that provides circuit breaking capabilities and power regulation capabilities is provided. The circuit includes a bidirectional cell having a set of forward switches for power flow during a forward mode of operation (forward power mode) and a set of reverse switches for providing reverse power flow during a reverse mode of operation (reverse power mode). A control inductor is included in the circuit during the reverse mode of operation for controlling current flow during the reverse mode of operation. A voltage clamping switch is activated to provide the control inductor in the circuit during the reverse mode of operation and is deactivated to remove the control inductor from the circuit during the forward mode of operation. A processor that activates the set of forward switches during the forward mode of operation and activates the set of reverse switches during the reverse mode of operation. The control inductor can be controlled during at least the reverse mode of operation. In one embodiment, the control inductor is controlled via a master controller. The bidirectional cell includes a capacitor that forms a bridge rectifier circuit with the set of forward switches during the forward mode of operation and forms a bridge rectifier circuit with the set of reverse switches during the reverse mode of operation.

Figure 1:
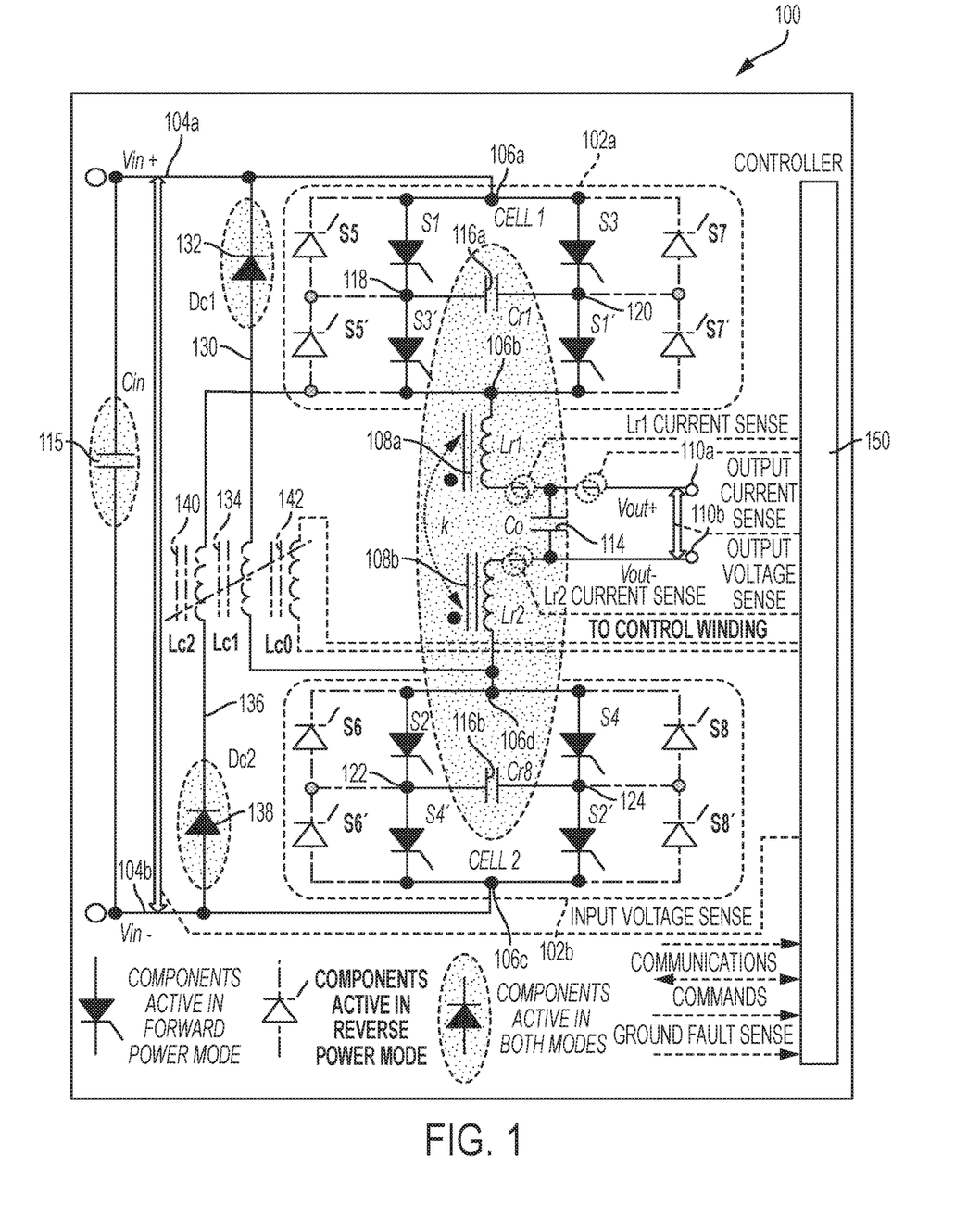
FIG. 1 shows a solid-state regulator and circuit breaker device according to an embodiment.

Turning now to FIG. 1, a solid-state regulator and circuit breaker device 100 is illustrated according to one embodiment. The regulator and circuit breaker device 100 provides circuit breaker and voltage regulation capabilities between voltage input rails (104a, 104b) and voltage output rails (110a, 110b) in both a forward power flow mode of operation and a reverse power flow mode of operation. The device 100 includes several circuit elements that operate in both the forward power mode and the reverse power mode. Additionally, the device 100 includes some circuit elements that operate only during the forward power mode and some circuit elements that operate only in the reverse power mode. These circuit elements are discussed in further detail below.

The device 100 includes a first bidirectional resonant cell 102a and a second bidirectional resonant cell 102b. The first bidirectional resonant cell 102a includes an input terminal 106a and an output terminal 106b. The input terminal 106a is connected to a first input voltage rail 104a (labelled Vin+). At the output terminal 106b, a first resonant inductor 108a is connected. The first resonant inductor 108a has a first terminal connected to the output terminal 106b of the first bidirectional resonant cell 102a and a second terminal connected to a first voltage output rail 110a (labelled Vout+).

The second bidirectional resonant cell 102 includes an input terminal 106c and an output terminal 106d. The input terminal 106c is connected to a second input voltage rail 104b (labelled Vin−). At the output terminal 106d, a second resonant inductor 108b is connected. The second resonant inductor 108b has a first terminal connected to the output terminal 106d of the second bidirectional cell 102b and a second terminal connected to a second output voltage rail 110b (labelled Vout−). A load (not shown) may be connected across the first voltage output rail 110a (Vout+) and the second voltage output rail 110b (Vout−).

The first resonance inductor 108a and the second resonance inductor 108b are magnetically coupled with respect to one another according to an inductance coupling value (k). The value of the coupling factor k between the first resonance inductor 108a and the second resonance inductor 108b can be varied to achieve desired electromechanical and thermal characteristics as understood by one of ordinary skill in the art. An output filter 114 (smoothing capacitor "Cout") can be connected between the first voltage output rail 110a and the second voltage output rail 110b to reduce undesired residual periodic variations (i.e., to smooth current transients) in the output current flowing through the first and second voltage output rails 110a-110b. An input filter 115 (smoothing capacitor "Cin") bridges the first input voltage rail 104a (Vin+) and the second input voltage rail 104b (Vin−) to smooth current transients flowing through first and second voltage input rails 104a-104b.

The first bidirectional resonant cell 102a includes a plurality of current-directional controlled semiconductor switching devices, also referred to herein as switches. The plurality of switches are separated into a first set of switches (switches S1, S1', S3 and S3') that is active when the device 100 is being operated in a forward power mode and a second set of switches (switches S5, S5', S7 and S7') that is active when the device 100 is being operated in a reverse power mode. A first resonance capacitor 116a is arranged to form a bridge rectifier circuit involving the first set of switches (S1, S1', S3 and S3') during the forward mode of operation and involving the second set of switches (S5, S5', S7 and S7') during the reverse mode of operation.

Figure 1A:
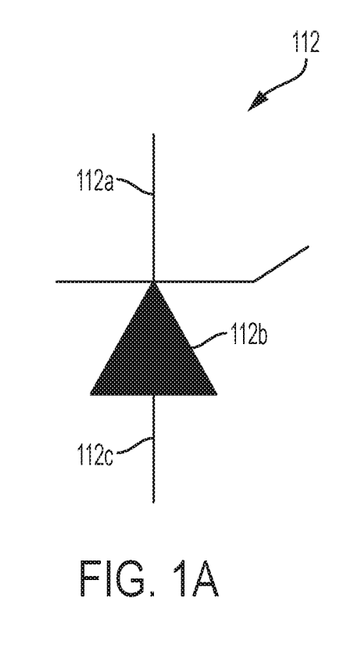
FIG. 1A shows details of a switching device of FIG. 1 for selectively interrupting current flow.

As shown in FIG. 1A, the switching devices may include, but are not limited to, thyristors that are configured to selectively interrupt current flow. In various embodiments, the switching devices are capable of reverse-voltage blocking. An exemplary thyristor 112 includes an anode 112a, a cathode 112c and a gate terminal 112b. The gate terminal 112b is configured to receive a gate signal generated by a microcontroller, controller or processor, for example. When a selected gate signal is applied to the gate terminal 112b of a respective thyristor, the thyristor allows an un-inhibited current flow from the anode 112a to the cathode 112c. In the absence of the gate signal or in the presence of a gate signal having an opposite bias, the thyristor prevents current flow thereby creating an open circuit, whereas the switch can be considered to be absent from the circuit.

Returning to the first bidirectional resonant cell 102a of FIG. 1, the anode of switch S1 is connected to input terminal 106a and the cathode of switch S1 is connected to an anode of switch S3' at node 118. The cathode of switch S3' is connected to output terminal 106b. Similarly, the anode of switch S3 is connected to the input terminal 106a and the cathode of switch S3 is connected to the anode of switch S1' at node 120. The cathode of switch S1' is connected to output terminal 106b. Capacitor 116a connects node 118 and node 120. In the forward mode of operation, the capacitor 116a forms a bridge rectifier circuit involving switches S1, S1', S3 and S3'.

The bidirectional resonant cell 102a also includes switches S5, S5', S7 and S7', for use during a reverse mode of operation. The anode of switch S5' is connected to output terminal 106b and the cathode of switch S5' is connected to the anode of switch S5 at node 118. The cathode of switch S5 is connected to input terminal 106a. Similarly, the anode of switch S7' is connected to output terminal 106b and the cathode of switch S7' is connected to the anode of switch S7 at node 120. The cathode of switch S7 is connected to the input terminal 106a. During the reverse mode of operation, capacitor 116a connects the nodes 118 and 120 and forms a bridge rectifier circuit involving switches S5, S5', S7 and S7'.

The second bidirectional resonant cell 102b includes a circuit structure similar to the first bidirectional resonant cell 102. The second bidirectional resonant cell 102b includes a first set of switches (S2, S2', S4 and S4') that is active when the device 100 is in a forward power mode and a second set of switches (S6, S6', S8 and S8') that is active when the device 100 is in a reverse power mode. A second resonance capacitor 116b is arranged to form a bridge rectifier circuit involving the first set of switches (S2, S2', S4 and S4') during the forward mode and involving the second set of switches (S6, S6', S8 and S8') during the reverse mode.

The anode of switch S2 is connected to the output terminal 106d and the cathode of switch S2 is connected to the anode of switch S4' at node 122. The cathode of switch S4' is connected to input terminal 106c. Similarly, the anode of switch S4 is connected to the output terminal 106d and the cathode of switch S4 is connected to the anode of switch S2' at node 124. The cathode side of switch S2' is connected to the input terminal 106c. Capacitor 116b connects the nodes 122 and 124. In a forward mode of operation, capacitor 116b forms a bridge rectifier circuit involving switches S2, S2', S4 and S4'.

The second bidirectional resonant cell 102b also includes switches S6, S6', S8 and S8' for use during a reverse mode of operation. The anode of switch S6' is connected to the input terminal 106c and the cathode of switch S6' is connected to the anode of switch S6 at node 122. The cathode of switch S6 is connected to the output terminal 106d. Similarly, the anode of switch S8' is connected to the input terminal 106c and the cathode of switch S8' is connected to the anode of switch S8 at node 124. The cathode of switch S8 is connected to the output terminal 106d. During the reverse mode of operation, capacitor 116b connects nodes 122 and 124 to from a bridge rectifier circuit involving switches S6, S6', S8 and S8'.

The device 100 further includes a first voltage clamping branch 130 extending from output terminal 106d of the second bidirectional resonant cell 102b to the first voltage rail 104a (Vin+). The first voltage clamping branch 130 includes a first clamping switch 132 and a first control inductor (LC1) 134 wired in series. The first clamping switch 132 may include a diode or other unidirectional device. Due to the polarity of the first clamping switch 132, during the forward mode of operation, the first control inductor 134 is held in a saturated state. During a reverse mode of operation, the first control inductor 134 is controlled by a master control inductor (Lco) 142.

The device 100 further includes a second voltage clamping branch 136 extending from the second voltage rail 104b (Vin-) to output terminal 106b of the first bidirectional resonant cell 102a. The second voltage clamping branch 136 includes a second clamping switch 138 and a second control inductor (LC2) 140 wired in series. The second clamping switch 138 may include a diode or other unidirectional device. Due to the polarity of the second clamping switch 138, during the forward mode of operation, the second control inductor 140 is held in a saturated state. During a reverse mode of operation, the second control inductor 140 is controlled by the master control inductor (Lco) 142.

Switches S1, S1', S2, S2', S3, S3', S4, S4' S5, S5', S6, S6', S7, S7', S8 and S8' are controlled by microcontroller 150. During a forward mode of operation, the microcontroller 150 sends a signal to switches S1, S1', S2, S2', S3, S3', S4 and S4' to include these switches in the circuit of device 100 while switches S5, S5', S6, S6', S7, S7', S8 and S8' are removed or left out of the circuit of device 100. The control inductors 134 and 140 are removed from the device 100 during the forward mode of operation. During a reverse mode of operation, the microcontroller 150 sends a signal to switches S5, S5', S6, S6', S7, S7', S8 and S8' to include these switches in the circuit of device 100 while switches S1, S1', S2, S2', S3, S3', S4 and S4' are removed or left out of the circuit of device 100. The control inductors 134 and 140 are placed into the device 100 in the reverse mode of operation.

The first control inductor 134 and the second control inductor 140 are inductively coupled to the master control inductor (Lco) 142. During the reverse mode of operation, the microcontroller 150 controls these control inductors 134 and 140 via master control inductor (LC0) 142 in order to influence operation of the device 100. In various embodiments, additional control inductors may be included at various locations within the device 100. In alternate embodiments, the device 100 may include more than one master control inductor. In alternate embodiments, first clamping switch 132 and second clamping switch 138 may be controllable clamping switches, (such as thyristors). In embodiments using controllable clamping switches 132 and 138, the microcontroller 150 may delay turning on the clamping switches 132 and 138 to increase the transient current and power limits in real time to accommodate pulsed loads or dynamic conditions (e.g. to speed up charging the output filter 114 during startup).

Figure 2:
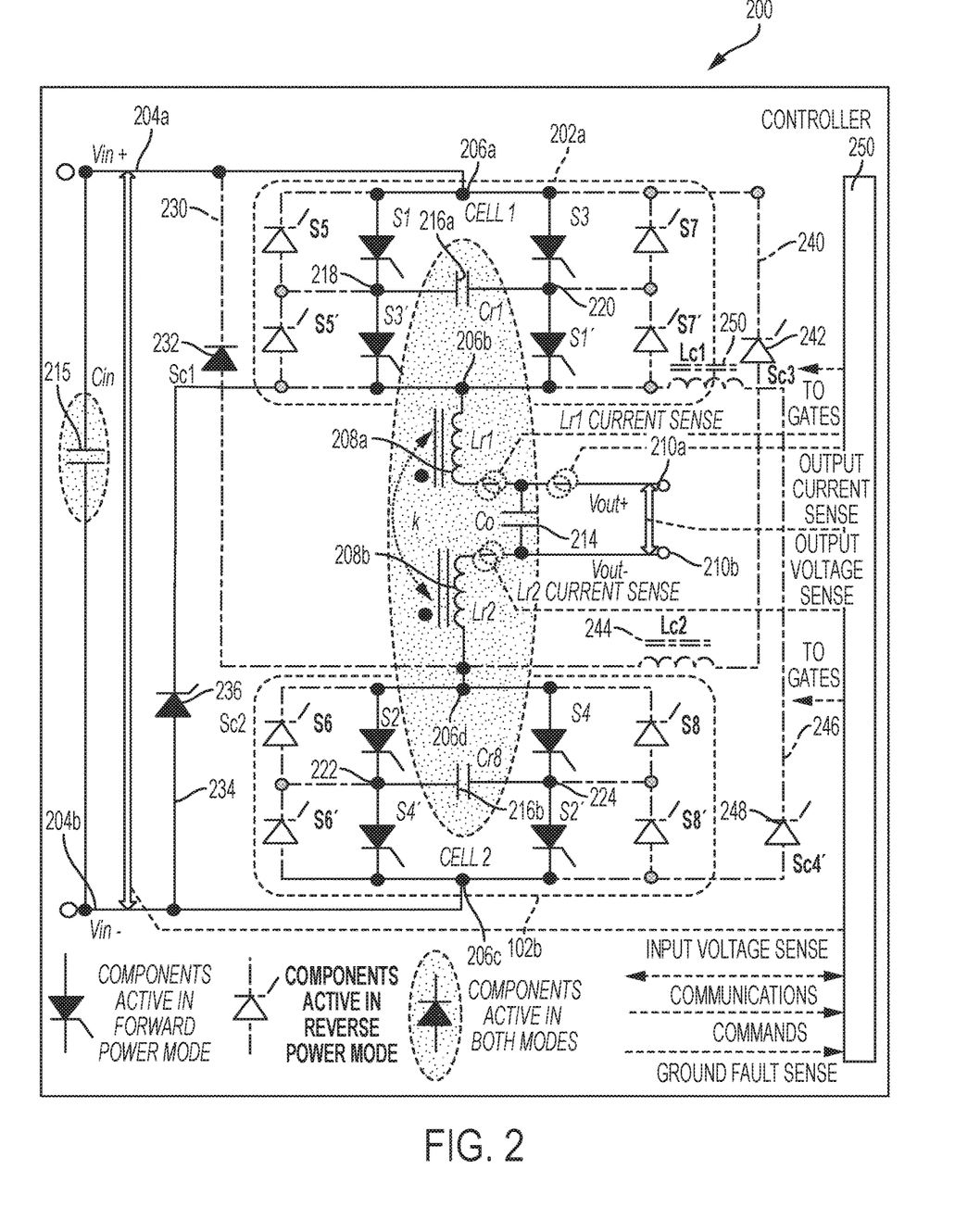
FIG. 2 shows a solid-state regulator and circuit breaker device according to an embodiment.

Turning now to FIG. 2, a solid-state regulator and circuit breaker device 200 is illustrated according to another embodiment. The regulator and circuit breaker device 200 provides circuit breaker and voltage regulation capabilities between voltage input rails (204a, 204b) and voltage output rails (210a, 210b). The device 200 includes several circuit elements that operate in both the forward power mode and the reverse power mode. Additionally, the device 200 includes some circuit elements that operate only during the forward power mode and some circuit elements that operate only in the reverse power mode, as discussed in further detail below.

The device 200 includes a first bidirectional resonant cell 202a and a second bidirectional resonant cell 202b. The first bidirectional resonant cell 202a includes an input terminal 206a and an output terminal 206b. The input terminal 206a is connected to the first input voltage rail 204a (labelled Vin+). The output terminal 206b is connected to a first resonant inductor 208a. The first resonant inductor 208a has a first terminal connected to the output terminal 206b of the first bidirectional resonant cell 202a and a second terminal connected to a first voltage output rail 210a (labelled Vout+).

The second bidirectional resonant cell 202b includes an input terminal 206c and an output terminal 206d. The input terminal 206c is connected to an input voltage rail 204b (labelled Vin-). The output terminal 206d is connected to a second resonant inductor 208b. The second resonant inductor 208b has a first terminal connected to output terminal 106d of the second bidirectional cell 202b and a second terminal connected to a second output voltage rail 210b (labelled Vout-). A load (not shown) may be connected across the first voltage output rail 210a (Vout+) and the second voltage output rail 210b (Vout-).

An output filter 214 (smoothing capacitor "Cout") can be connected between the first voltage output rail 210a and the second voltage output rail 210b to reduce undesired residual periodic variations (i.e., to smooth current transients) in the output current flowing through the first and second voltage output rails 110a-110b. An input filter 215 (smoothing capacitor "Cin") bridges the first input voltage rail 104a (Vin+) and the second input voltage rail 104b (Vin-) to smooth current transients flowing through first and second voltage input rails 104a-104b.

The first bidirectional resonant cell 202a includes a plurality of switches (S1, S1', S3, S3', S5, S5', S7, and S7'). The plurality of switches are separated into a first set of switches (switches S1, S1', S3 and S3') that is active when the device 100 is being operated in a forward power mode and a second set of switches (switches S5, S5', S7 and S7') that is active when the device 200 is being operated in a reverse power mode. A first resonance capacitor 216a is arranged as a bridge rectifier circuit involving the first set of switches (S1, S1', S3 and S3') during the forward mode of operation and involving the second set of switches (S5, S5', S7 and S7') during the reverse mode of operation.

The anode of switch S1 is connected to input terminal 206a and the cathode side of switch S1 is connected to an anode of switch S3' at node 218. The cathode side of switch S3' is connected to output terminal 206b. Similarly, the anode of switch S3 is connected to the input terminal 206a and the cathode of switch S3 is connected to the anode of switch S1' at node 220. The cathode of switch S1' is connected to output terminal 206b. Capacitor 216a connects node 218 and node 220. In the forward mode of operation, the capacitor 216a forms a bridge rectifier circuit involving switches S1, S1', S3 and S3'.

The bidirectional resonant cell 202a also includes switches S5, S5', S7 and S7', for use during a reverse mode of operation. The anode of switch S5' is connected to output terminal 206b and the cathode of switch S5' is connected to the anode of switch S5 at node 218. The cathode of switch S5 is connected to input terminal 206a. Similarly, the anode of switch S7' is connected to output terminal 206b and the cathode of switch S7' is connected to the anode of switch S7 at node 120. The cathode of switch S7 is connected to the input terminal 206a. During the reverse mode of operation, capacitor 216a connects the nodes 218 and 220 and forms a bridge rectifier circuit involving switches S5, S5', S7 and S7'.

The second bidirectional resonant cell 202b includes a circuit structure similar to the first bidirectional resonant cell 202a. The second bidirectional resonant cell 202b includes a first set of switches (S2, S2', S4 and S4') that is active when the device 200 is in a forward power mode and a second set of switches (S6, S6', S8 and S8') that is active when the device 200 is in a reverse power mode. A second resonance capacitor 216b is arranged as a bridge rectifier circuit between the first set of switches (S2, S2', S4 and S4') during the forward mode and between the second set of switches (S6, S6', S8 and S8') during the reverse mode.

The anode of switch S2 is connected to the output terminal 206d and the cathode of switch S2 is connected to the anode of switch S4' at node 222. The cathode of switch S4' is connected to input terminal 206c. Similarly, the anode of switch S4 is connected to the output terminal 206d and the cathode of switch S4 is connected to the anode of switch S2' at node 224. The cathode of switch S2' is connected to the input terminal 206c. Capacitor 216b connects the nodes 222 and 224. In a forward mode of operation, capacitor 216b forms a bridge rectifier circuit involving switches S2, S2', S4 and S4'.

The second bidirectional resonant cell 202b also includes switches S6, S6', S8 and S8' for use during a reverse mode of operation. The anode of switch S6' is connected to the input terminal 206c and the cathode of switch S6' is connected to the anode of switch S6 at node 222. The cathode of switch S6 is connected to the output terminal 206d. Similarly, the anode of switch S8' is connected to the input terminal 206c and the cathode of switch S8' is connected to the anode of switch S8 at node 224. The cathode of switch S8 is connected to the output terminal 206d. During the reverse mode of operation, capacitor 216b connects nodes 222 and 224 to from a bridge rectifier circuit involving switches S6, S6', S8 and S8'.

Device 200 includes circuit branch 230 extending from output terminal 206d of the second bidirectional resonance cell 202b to first input voltage rail (Vin+). Circuit branch 230 includes clamping switch 232 that allows current flow during a forward mode of operation and is an open circuit during a reverse mode of operation. Device 100 also includes circuit branch 234 extends from second input voltage rail (Vin−) to output terminal 206b of the first bidirectional resonance cell 202a. Circuit branch 234 includes clamping switch 236 that allows current flow during a forward mode of operation and is an open circuit during a reverse mode of operation.

Device 200 further includes a circuit branch 240 extending from output terminal 206d of the second bidirectional resonant cell 202b to the first input voltage rail (Vin+). Circuit branch 240 includes a third clamping switch SC3 (242) and a second control inductor (LC2) 244 wired in series. A terminal of the second control inductor (LC2) 244 is connected to the output terminal 206d and a terminal of the third clamping switch 242 is connected to the first input voltage rail 204a (Vin+).

Device 200 further includes a circuit branch 246 extending from second input voltage rail 204b (Vin−) to output terminal 206b of the first bidirectional resonant cell 202a. Circuit branch 244 includes a fourth clamping switch SC4 (248) and a first control inductor (LC1) 250 wired in series. A terminal of the first control inductor (LC1) 250 is connected to the output terminal 206b and a terminal of the third clamping switch 242 is connected to second input voltage rail 204b (Vin−).

Switches S1, S1', S2, S2', S3, S3', S4, S4' S5, S5', S6, S6', S7, S7', S8 and S8' are controlled by microcontroller 250. During a forward mode of operation, the microcontroller 250 sends a signal to switches S1, S1', S2, S2', S3, S3', S4 and S4' to include these switches in the circuit of device 200 while switches S5, S5', S6, S6', S7, S7', S8 and S8' are removed or left out of the circuit of device 200. Additionally, the microcontroller 250 sends signals the clamping switches SC1 and SC2 to include branches 230 and 234, respectively in the circuit of the device. The microcontroller 250 further shuts off clamping switches SC3 and SC4, thereby excluding first control inductor (LC1) 250 and second control inductor (LC2) 244 from the circuit.

During a reverse mode of operation, the microcontroller 250 sends a signal to switches S5, S5', S6, S6', S7, S7', S8 and S8' to include these switches in the circuit of device 100 while switches S1, S1', S2, S2', S3, S3', S4 and S4' are removed or left out of the circuit of device 100. Additionally, the microcontroller 250 sends signals to the clamping switches SC1 and SC2 to remove branches 230 and 234, respectively, from the circuit of the device. The microcontroller 250 further provides signals to clamping switches SC3 and SC4 to include first control inductor (LC1) 250 and second control inductor (LC2) 244 in the circuit. By delaying turning on of the clamping switches 232, 236, 242 and 248, the microcontroller 250 may increase the transient current and power limits in real time to accommodate pulsed loads or dynamic conditions (e.g. to speed up charging the output filter 214 during startup).

Figure 3:
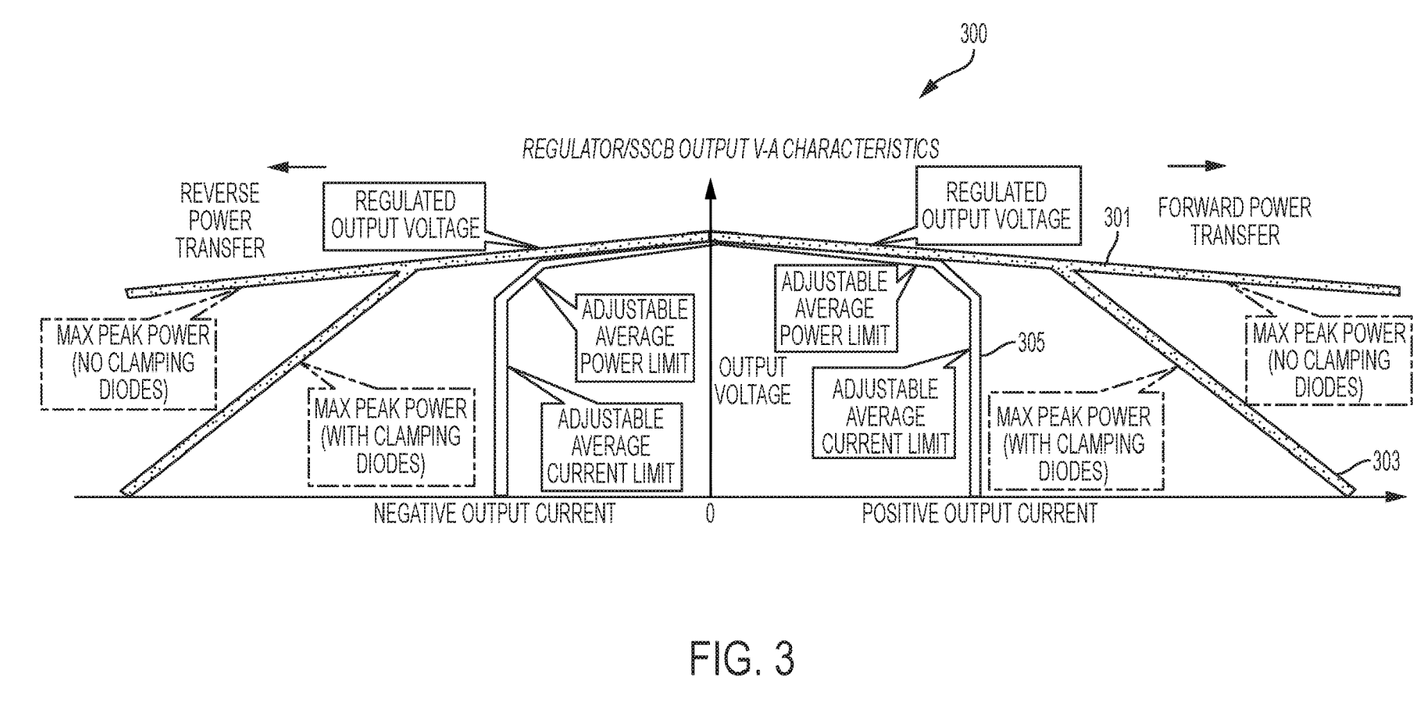
FIG. 3 shows a graph of voltage vs. current characteristics for at least one of the exemplary devices of FIGS. 1 and 2.

FIG. 3 shows a graph 300 of voltage vs. current characteristics for at least one of the exemplary devices 100, 200 of FIGS. 1 and 2. Two quadrants are shown in FIG. 3: a first quadrant representing positive voltage and positive output current and a second quadrant representing positive voltage and negative output current. Nonetheless, a complete graph including a third quadrant representing negative voltage and negative output current and a fourth quadrant representing negative voltage and positive output current can be determined from this graph 300.

Curve 301 of FIG. 3 represents a maximum peak power provided in exemplary circuit 100 in which no clamping diodes (i.e., clamping diodes DC1 and DC2) are employed. For any allowable voltage, the current is unlimited in both the positive or negative direction. (The impedance of the input voltage source at the terminals 104a, 104b and 204a, 204b is negligibly low and therefore is not taken into account.) Curve 303 represents peak current and power limits provided by the clamping branches 130 and 136. If controllable clamping switches (e.g., thyristors) in place of diodes 132 and 138, the device 100 acquires adaptive capabilities. By controlling the turn-on timing of the clamping controllable clamping switches, the device 100 dynamically regulates the maximum current and power limits represented by curve 303 to accommodate pulsed loads. Curve 305 shows an average regulated current at the output of the device 100 using the control mechanism provided by controlling the switches and clamping branches.

Figure 4:
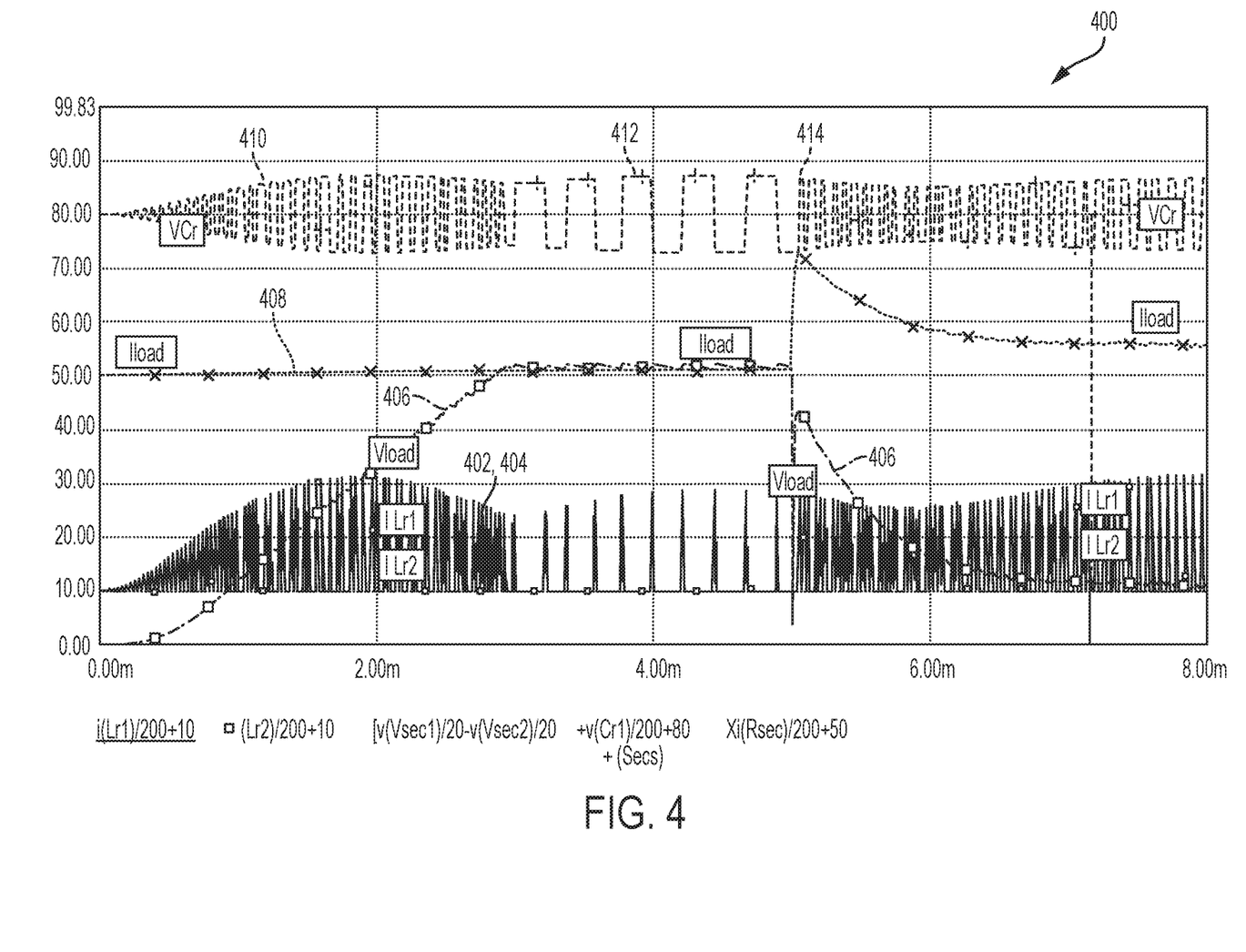
FIG. 4 shows a graph of various parameters of exemplary device when run in a forward power mode.

FIG. 4 shows a graph 400 of various parameters of exemplary device 100 when run in a forward power mode. Time is plotted along the abscissa. The ordinate does not include a particular unit labelling, but the various parameters are scaled and translated along the abscissa in order to display their temporal relation in the graph. A table showing parameter conversions is shown below in Table 1.

TABLE 1

| Parameter | Conversion |
| --- | --- |
| $I_{Lr1}$ | $I_{Lr1}/200 + 20$ |
| $I_{Lr2}$ | $I_{Lr2}/200 + 20$ |
| $V_{Load}$ | $V_{Load}/20$ |
| $V_{Cr}$ | $V_{Cr}/200 + 80$ |
| $I_{Load}$ | $xR_{sec}/200 + 50$ | where $R_{sec}$ is the current sense resistance of the device 100 at the point of coupling to the load.

The parameters shown in graph 400 are measured across various elements of the device 100 operating into a pulsed load of 20% nominal load from time interval of =0 to ~5 milliseconds and 400% overload from time interval of ~5 to 8 milliseconds. For example, $I_{Lr1}$ and $I_{Lr2}$ (402, 404) are currents flowing through first resonance inductor 108*a* and second resonance inductor 108*b*, respectively. $V_{Load}$ 406 is a voltage across a load connected between $V_{out+}$ and $V_{out-}$. Similarly, $I_{Load}$ 408 is a current flowing through the load. $V_{Cr}$ 410 is a voltage across a resonance capacitor, e.g., first resonant capacitor Cr1 (116*a*).

As the load voltage $V_{Load}$ ramps up from zero (at time t=0) to a selected voltage (at time=~3 milliseconds), the current through the resonance inductors $I_{Lr1}$ and $I_{Lr2}$ (402, 404) undergo fluctuations in amplitude and periodicity. Similarly, voltage across the resonance capacitor ($V_{Cr}$) undergoes fluctuations in amplitude and periodicity. During the ramping up of the load voltage, the load current $I_{Load}$ 408 remains relatively constant, with a slight increase over time. Once the load voltage $V_{Load}$ 406 reaches a set voltage (at time=~3 milliseconds), the actions of the clamped switches provide a square wave voltage 412 across the resonance capacitor, with a set period. With voltage $V_{Load}$ 406 at the set voltage, the currents $I_{Lr1}$ and $I_{Lr2}$ (402, 404) provide spikes having a set period related to the period of the voltage $V_{Cr}$ 412 across the resonance capacitor. At time 5=~5 milliseconds (indicated by 414), a power surge event occurs in the device. As the load current $I_{Load}$ 408 increases, the load voltage $V_{Load}$ 406 decrease, so that power in the device 100 is regulated.

Figure 5:
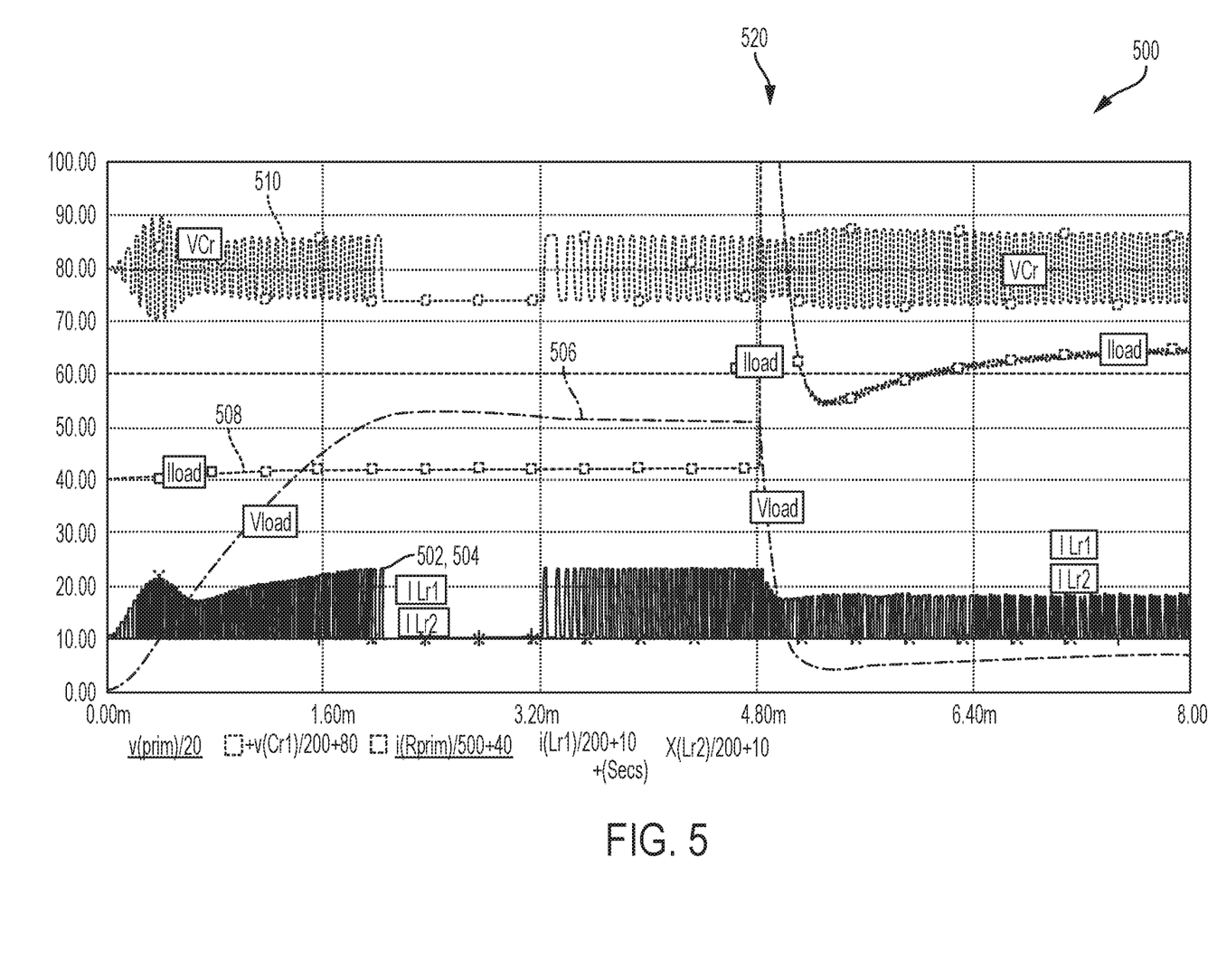
FIG. 5 shows a graph of various parameters of exemplary device when run in a reverse power mode.

FIG. 5 shows a graph 500 of various parameters of exemplary device 100 when run in a reverse power mode operating into a pulsed load of 20% nominal load from time interval of =0 to ~4.8 milliseconds and short circuit from time interval of ~4.8 to 8 milliseconds. Time is plotted along the abscissa. The ordinate does not include a particular unit labelling, but the various parameters are scaled and translated along the abscissa in order to display their temporal relation in the graph, using the conversions of Table 1.

The parameters shown in graph 500 include current flowing through first resonance inductor $I_{Lr1}$ 502, current flowing through second resonance inductor $I_{Lr2}$ 504, load voltage $V_{Load}$ 506, load current $I_{Load}$ 508 and voltage across a resonance capacitor. $V_{Cr}$ 510. In the reverse mode, as the load voltage $V_{Load}$ 506 ramps up from zero (at time t=0) to a selected voltage (at time t=~2 milliseconds), the current through the resonance inductors $I_{Lr1}$ and $I_{Lr2}$ (502, 504) undergo fluctuations in amplitude and periodicity. Similarly, voltage across the resonance capacitor $V_{Cr}$ 510 undergoes fluctuations in amplitude and periodicity. During the ramping up of the load voltage, the load current $I_{load}$ 508 remains relatively constant, with a slight increase over time.

At time t=~2 milliseconds, the load voltage exceeds a selected voltage threshold. While the load voltage is above the voltage threshold (i.e., from t=~2 milliseconds to t=~3.2 milliseconds), the current through the resonance inductors $I_{Lr1}$ and $I_{Lr2}$ (502, 504) drops to zero and the voltage $V_{Cr}$ 510 across the resonance capacitor is held at a constant voltage. Once the load voltage drops back to the voltage threshold (at time t=~3.2 milliseconds), currents $L_{Lr1}$ and $L_{Lr2}$ (502, 504) and the voltage $V_{Cr}$ 510 across the resonance capacitor resume a periodic behavior. A power surge event occurs at time t=~4.8 milliseconds (indicated by arrow 520). At the power surge, the load current $L_{Load}$ 508 increase while load voltage $V_{Load}$ 510 decreases to counteract the increase in load current, so that power in load is regulated.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An electric circuit, comprising:
   a first bidirectional cell including a set of forward switches for power flow during a forward mode of operation and a set of reverse switches for providing reverse power flow during a reverse mode of operation;
   a first inductor for controlling current flow during the reverse mode of operation;
   an input terminal and output terminal of the first bidirectional cell, the input terminal being connected to a first input voltage rail;
   a second bidirectional cell having an input terminal connected to a second input voltage rail and an output terminal;
   a first circuit branch connecting the output terminal of the second bidirectional cell to the first input voltage rail, the first circuit branch including a first clamping switch active during the forward mode of operation;
   a second circuit branch connecting the second input voltage rail to an output terminal of the first bidirectional cell, the second circuit branch including a second clamping switch active during the forward mode of operation;
   a third circuit branch connecting the output terminal of the second bidirectional cell to the first input voltage rail, the third circuit branch including a second inductor and a third clamping switch active to allow current flow through the third circuit branch during the reverse mode operation;
   a fourth circuit branch connecting the second input voltage rail to the output terminal of the first bidirectional cell, the fourth circuit branch including the first inductor and a fourth clamping switch active to allow current flow through the fourth circuit branch during the reverse mode of operation and to act as an open circuit during the forward mode of operation; and a controller configured to control a turn-on timing of the first voltage clamping switch to regulate a power limit for a pulsed load.

2. The electric circuit of claim 1, wherein the first bidirectional cell includes a capacitor that forms a bridge rectifier circuit with the set of forward switches in the forward mode of operation and forms a bridge rectifier circuit with the set of reverse switches in the reverse mode of operation.

3. The electric circuit of claim 1, further comprising a third inductor for controlling the first inductor during at least the reverse mode of operation.

4. The electric circuit of claim 3 further comprising a processor that activates the set of forward switches during the forward mode of operation and activates the set of reverse switches during the reverse mode of operation.

5. A method of regulating current and providing a circuit breaker to a circuit, the method comprising:
    forming an electric circuit between a first input voltage rail and a second input voltage rail, the electrical circuit including:
        a first bidirectional cell including a set of forward switches for power flow during a forward mode of operation and a set of reverse switches for providing reverse power flow during a reverse mode of operation,
        a first control inductor for controlling current flow during a reverse mode of operation, and
        an input terminal and an output terminal of a first bidirectional cell, the input terminal being connected to the first input voltage rail,
        a second bidirectional cell having an input terminal connected to the second input voltage rail and an output terminal,
        a first circuit branch connecting an output terminal of the second bidirectional cell to the first input voltage rail, the first circuit branch including a first clamping switch activated during the forward mode of operation,
        a second circuit branch connecting the second input voltage rail to the output terminal of the first bidirectional cell, the second circuit branch including a second clamping switch activated during the forward mode of operation,
        a third circuit branch connecting output terminal of the second bidirectional cell to the first input voltage rail, the third circuit branch including a second inductor and a third clamping switch is activated during the reverse mode of operation to allow current flow through the third circuit branch;
        a fourth circuit branch connecting the second input voltage rail to the output terminal of the first bidirectional cell, the fourth circuit branch including the first inductor and a fourth clamping switch activated during the reverse mode of operation to allow current flow through the fourth circuit branch and to act as an open circuit in at least the forward mode of operation; and
    controlling a timing of the first voltage clamping switch to regulate a power limit for a pulsed load.

6. The method of claim 5, wherein the first bidirectional cell includes a capacitor that forms a bridge rectifier circuit with the set of forward switches in the forward mode of operation and forms a bridge rectifier circuit with the set of reverse switches in the reverse mode of operation.

7. The method of claim 6, further comprising controlling a timing for turning on the first voltage clamping switch in order to dynamically regulate a maximum current and power in the device.

8. The method of claim 7, further comprising activating the set of forward switches during the forward mode of operation and activating the set of reverse switches during the reverse mode of operation.

9. An electric system, comprising:
    a circuit for power regulation and circuit breaking, the circuit including:
        a first bidirectional cell including a set of forward switches for power flow during a forward mode of operation and a set of reverse switches for providing reverse power flow during a reverse mode of operation;
        a first control inductor for controlling current flow during the reverse mode of operation;
        an input terminal and an output terminal of the first bidirectional cell, the input terminal being connected to a first input voltage rail;
        a second bidirectional cell having an input terminal connected to a second input voltage rail and an output terminal;
        a first circuit branch connecting an output terminal of the second bidirectional cell to the first input voltage rail, the first circuit branch including a first clamping switch active during the forward mode of operation;
        a second circuit branch connecting the second input voltage rail to an output terminal of the first bidirectional cell, the second circuit branch including a second clamping switch active during the forward mode of operation;
        a third circuit branch connecting output terminal of the second bidirectional cell to the first input voltage rail, the third circuit branch including a second inductor and a third clamping switch active during the reverse mode operation to provide the second inductor into the circuit;
        a fourth circuit branch connecting the second input voltage rail to the output terminal of the first bidirectional cell, the fourth circuit branch including the first inductor and a fourth clamping switch active during the reverse mode of operation to provide the first inductor into the circuit and remove the branch including the first control inductor from the circuit during the forward mode of operation; and
        a controller configured to control a turn-on timing of the first voltage clamping switch to regulate a power limit for a pulsed load.

10. The electric system of claim 9, wherein the circuit includes a third inductor for controlling the first inductor during at least the reverse mode of operation.

11. The electric system of claim 10 further comprising a processor that activates the set of forward switches during the forward mode of operation and activates the set of reverse switches during the reverse mode of operation.

* * * * *